Feb. 25, 1941.  E. C. ATWELL ET AL  2,233,070
HOLDER FOR HOLLOW ARTICLES
Filed March 9, 1938  3 Sheets-Sheet 1
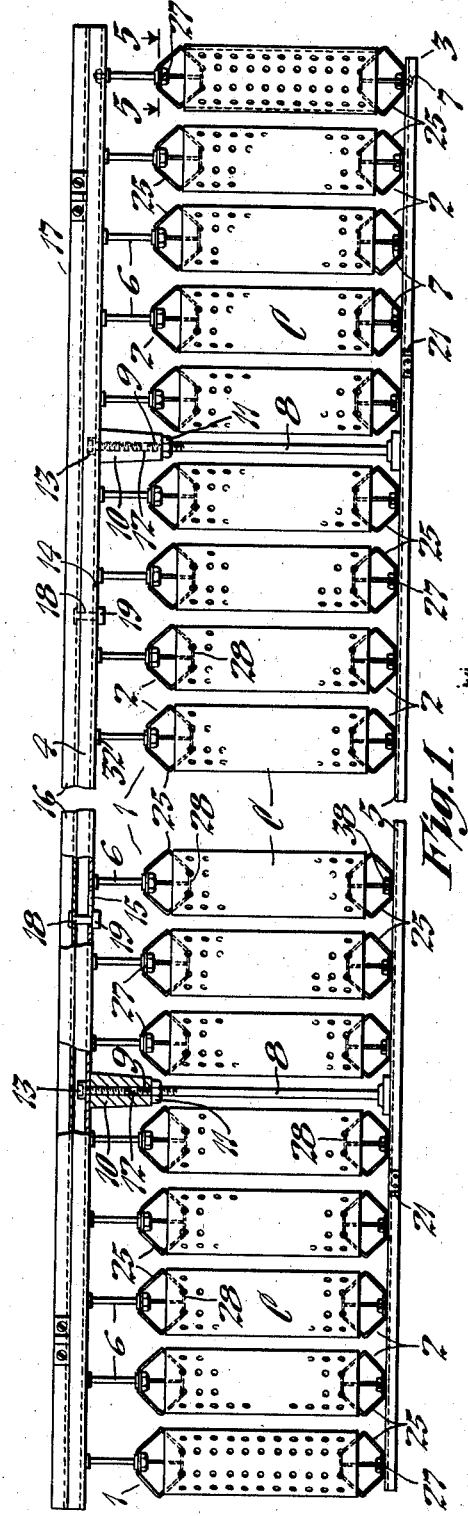
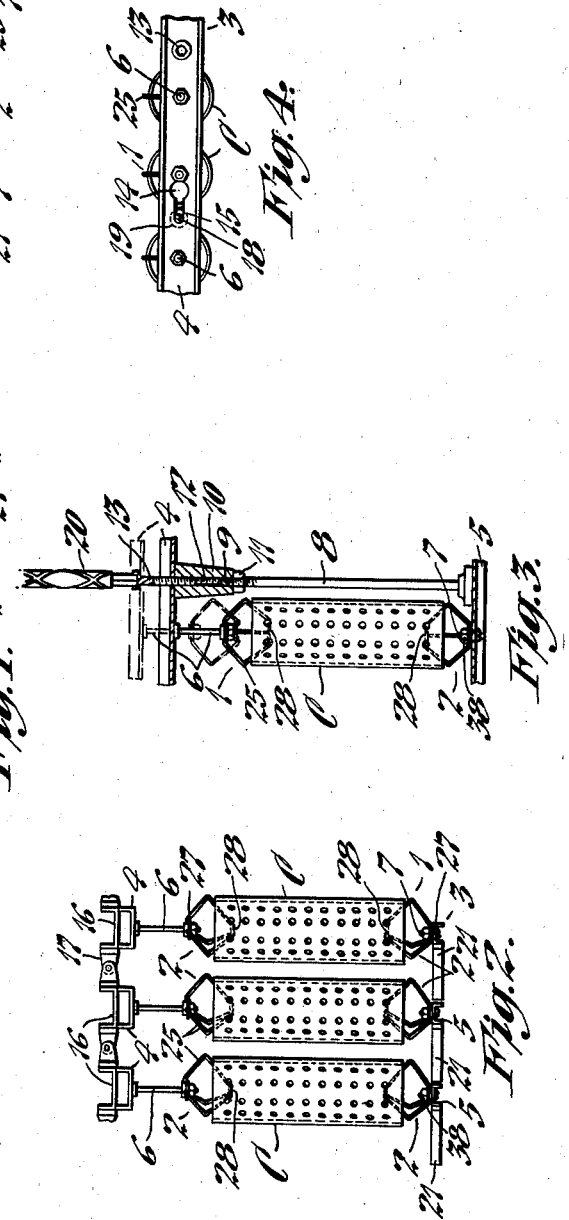

Feb. 25, 1941.  E. C. ATWELL ET AL  2,233,070
HOLDER FOR HOLLOW ARTICLES
Filed March 9, 1938  3 Sheets-Sheet 2

Inventors:
Everett C. Atwell, George W. Tew
and Herbert Austin
By *Pennington and White*
Attorneys.

Feb. 25, 1941.  E. C. ATWELL ET AL  2,233,070
HOLDER FOR HOLLOW ARTICLES
Filed March 9, 1938  3 Sheets-Sheet 3

Inventors:
Everett C. Atwell, George W. Tew
and Herbert Austin
By
Attorneys.

Patented Feb. 25, 1941

2,233,070

UNITED STATES PATENT OFFICE 2,233,070

HOLDER FOR HOLLOW ARTICLES

Everett C. Atwell, Cranston, R. I., and George W. Tew, Swansea, and Herbert Austin, South Somerset, Mass., assignors to Atlantic Rayon Corporation, a corporation of Rhode Island Application March 9, 1938, Serial No. 194,860

8 Claims. (Cl. 91—60)

The present invention relates to improvements in devices for supporting or holding hollow articles during coating, impregnating or other treatment thereof. Although adapted for other uses the holders constituting the subject-matter of the present invention are particularly adapted for supporting paper or fiber articles such as cop-tubes during treatment in apparatus of the type illustrated and described in a pending application for United States Letters Patent, Serial No. 175,687, filed November 20, 1937, by Everett C. Atwell.

One of the objects of the present invention is to provide a holder of the type indicated which facilitates the application of the paper cop-tubes or other hollow articles thereto and their removal therefrom.

Another object of the invention is to provide a holder of the type indicated which frictionally engages the interior of the articles at a plurality of spaced points with a minimum of surface contact thereon.

Another object of the invention is to provide a holder of the type indicated having a plurality of resilient spring-fingers arranged to yieldingly engage the interior of the cop-tubes or the like at a plurality of points spaced circumferentially and longitudinally thereof.

Still another object of the invention is to provide a holder of the type indicated which is light in weight, of simple construction to adapt it for economical manufacture, and one which facilitates the application of cop-tubes or the like thereto while being positive in retaining the same in fixed position thereon.

Further objects of the invention are set forth in the following specification which describes, by way of example, several forms of the improved holder as illustrated by the accompanying drawings. In the drawings:

Fig. 1 is a side elevational view of a rack or frame suspended from a conveyor-chain and having a series of holders of a preferred construction mounted on the rack for supporting a group of cop-tubes or the like in laterally-spaced relationship;

Fig. 2 is an end elevation of the conveyor-chain showing a series of the racks or frames mounted thereon with cop-tubes clamped between the opposite heads of the holders carried by the spaced rails of the racks;

Fig. 3 is a longitudinal sectional view of the rack or frame showing the manner in which the frame is extended with the opposite rails separated relatively of each other to release the cop-tubes;

Fig. 4 is a fragmentary plan view of the top rail of the frame showing the slotted construction thereof which adapts it for convenient connection with the conveyor-chain;

Figure 5:
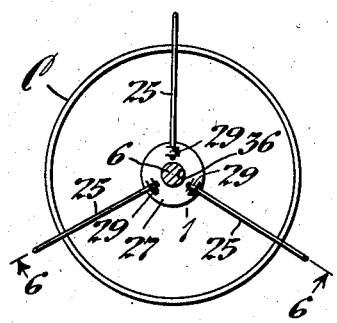
Fig. 5 is a part-sectional plan view on line 5—5 of Fig. 1 showing the angular relationship of the spring-fingers of one of the holders and the manner of connecting the adjacent ends of the fingers.

In accordance with the invention illustrated and described in the Atwell application for United States Letters Patent, referred to above, hollow paper cop-tubes and the like are supported on a traveling conveyor and dipped in a resin or other impregnating solution and thereafter the solution is dried and baked onto the tubes under controlled conditions. The holders constituting the subject-matter of the present invention are particularly adapted for holding or supporting the paper cop-tubes during their treatment in the apparatus disclosed in the Atwell application or in other forms of dipping, drying and baking apparatus. To properly perform their intended function the holders must be of light weight; of a construction to adapt the resin or other impregnating fluid to drain freely from the parts of the holder without dripping on other parts therebelow; and also adapted to support the articles with a minimum of actual contact thereon. For example, if the holder is not of light weight the number of tubes that can be treated in the apparatus is limited by the cumulative weight of a plurality of the holders. If the holder has large and bulky contact elements the resin or other treating solution will not drain freely therefrom after the holder is dipped in the solution and the solution will gradually accumulate thereon, preventing the proper functioning of the elements. If the spring-elements of opposite series overlie each other the resin or other treating solution will drip from the upper elements directly onto those below and the solution, being slightly congealed or gummy, will adhere to the lower elements and accumulate thereon. If the spring-elements of the holders have a large area of contact with the tube they will prevent the resin from coating the tube on the area directly thereunder. Further, the solution naturally will adhere to the elements and after it is baked the bond interferes with the easy detachment of the tubes from the holder. After removal of the tubes the resin on the holder around the contact-elements is apt to be broken leaving a relatively large exposed area on the tube. As another prerequisite, the holder must contact the cop-tube interiorly so as not to mar the smooth outer surface on which yarn is to be wound.

Applicant's holder meets all of these requirements, being of skeleton form and comprising a plurality of angularly-related radially-extending resilient fingers adapted to engage the interior of the tube at a series of points spaced circumferentially and longitudinally thereof. The spring-fingers, being formed of wire or thin sheet-metal, provide a holder of light weight while at the same time are sufficiently rigid to support the tube. Fingers of round wire are particularly adapted to permit drainage of the resin or other treating fluid therefrom and the fingers of opposite series are arranged in angularly offset relationship so that the resin dripping from the upper fingers will not collect on the fingers therebelow. Further, the diameter of the wire being considerably less than that of the tube the fingers will engage the tube at a single point only; in other words, the area of contact of the fingers with the tube is reduced to a minimum.

Figs. 1 to 6 of the drawings illustrate a preferred form of holder 1 comprising upper and lower heads 2 which are relatively movable toward each other to clamp a paper cop-tube C or other hollow article therebetween. As illustrated in Fig. 1, a series of the holders 1 are arranged in laterally-spaced relationship in a rack or frame 3 having opposite supporting rails 4 and 5 of channel form. The rail 4 supports a series of upper heads 2 suspended therefrom by rods 6, while the opposite rail 5 supports a series of lower heads 2 directly connected thereto by means of bolts 7.

The rails 4 and 5 are connected together by means of tie-rods 8 rigidly secured at one end to the lower rail 5 as by welding or the like. The opposite ends 9 of the tie-rods 8 are threaded to receive spacing bushings 10 having threaded bores 12. The bushings 10 are screwed to a predetermined position on the threaded ends 9 of the tie-rods 8 and then clamped in place by check-nuts 11 screwed against the ends of the bushings. The upper rail 4 is clamped against the upper ends of the bushings 10 by screws 13 which extend through holes in the rail and are screwed into the threaded bores 12 in the bushings. When the screws 13 are partially withdrawn the rail 4 may be moved relatively of the rail 5 to separate the upper and lower heads 2 and thereby release the cop-tubes C held therebetween. Fig. 3 illustrates the screw 13 as partially withdrawn, a ratchet wrench 20 being usually employed to facilitate this operation, so as to permit the rail 4 to be moved to the position illustrated by dotted lines.

The rails 4 and 5 are preferably constructed of light-weight material such as aluminum or Duralumin so that a complete rack 3 can be easily handled, and preferably the rack is placed in a suitable fixture while the rail 4 is being shifted in position to permit removal of treated cop-tubes C and the application of other tubes thereto. The upper rail 4 is provided with a series of button-holes, see Fig. 4, each having a circular opening 14 and a relatively narrow slot 15 leading thereinto to adapt the frame 3 to be attached to a crossbar or batten 16 on the links of a conveyor-chain 17. Each of the battens 16 has depending studs 18 with enlarged heads 19 which are adapted to pass through the circular openings 14 in the rack rail 4 and to underlie the rail at the sides of the slots 15 when the frame 3 is slid laterally of the studs.

Figure 6:
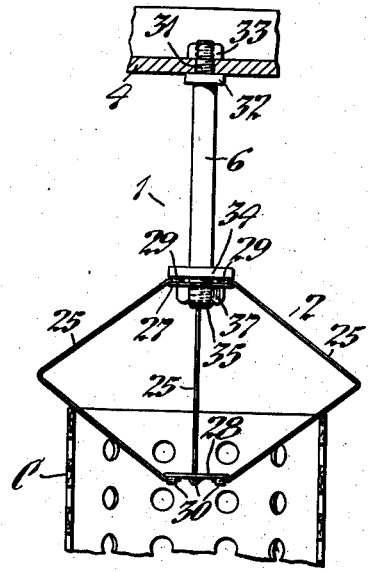
Fig. 6 is a longitudinal sectional view on line 6—6 of Fig. 5 showing the angular form of the spring-fingers and the manner in which they engage the interior edges of the cop-tube at spaced points thereon.

The opposite heads 2 of each holder may be of substantially identical construction as illustrated in detail in Figs. 5 and 6. Each head comprises a plurality of spring-elements or fingers 25 of elbow-shape, arranged in equi-angular relationship with their adjacent ends connected together to form a semi-rigid skeleton framework having the general shape of a double cone, see also Fig. 1. As herein illustrated, each head has three spring-fingers 25 arranged 120° apart and each of the fingers is made of round wire of relatively small diameter. The opposite ends of the spring-fingers 25 are bent into parallel relationship and connected to disks or collars 27 and 28. Preferably, the ends of the fingers 25 are inserted through loops 29 and 30 on the disks 27 and 28 and soldered thereto to provide a rigid connection.

As illustrated in Fig. 6, each of the rods 6 for supporting the upper heads 2 has a threaded end 31 adapted to project through a hole in the rail 4 with an integral flange or collar 32 below its threaded end. The flange 32 of each rod 6 is held in abutting engagement with the rail 4 by means of a nut 33 screwed onto the threaded end 31 of the rod against the upper side of the rail. The lower end of each rod 6 is of a construction similar to that at its upper end, having a flange 34 and reduced threaded end 35 which extends through a hole 36 in the disk 27 of the upper head 2. The disk 27 is clamped against the flange 34 by a nut 37 screwed onto the threaded end 35 of the rod 6. The opposite or lower heads 2, of identical construction, are directly supported on the rail 5 and clamped thereto by bolts 7 which extend through holes 36 in the disk 27 with nuts 38 on their threaded ends, see Fig. 2. The opposite heads 2 are thus supported on the rails 4 and 5 in vertically-spaced relationship to adapt them to enter the opposite ends of the cop-tubes C or other hollow articles and engage the spring-fingers 25 with the interior edges thereof at spaced points thereon as illustrated in Figs. 1, 5 and 6.

To supply the rack or frame 3 with a plurality of cop-tubes C or other hollow articles the screws 13 are partially withdrawn and the rail 4 moved away from the rail 5 to separate the opposite heads 2 of the series of holders 1 mounted thereon. Preferably, the frame 3 is supported in a suitable fixture to hold the rails 4 and 5 apart and the cop-tubes C are placed in position with their lower ends overlying the lower heads 2. The rail 4 is then lowered toward the rail 5 to engage the upper heads 2 of the holders with the upper ends of the cop-tubes C and the screws 13 are then screwed into the threaded bores 12 of the bushings 10. The conical ends of the upper and lower heads 2 are thus forced into the opposite ends of the cop-tubes C to clamp them therebetween, the heads being formed of resilient wire will yield sufficiently to insure engagement of all of their fingers with the interior edges of the tubes. Due to the skeleton construction of the heads 2 the spring-fingers 25 engage the opposite interior edges of the cop-tubes C at a series of circumferentially-spaced points. The fingers 25, being constructed of round wire of relatively small diameter, contact the cop-tubes C only slightly, that is, the contact area of the fingers on the tubes is reduced to a minimum. The lower heads 2 are mounted on the rail 5 with their fingers 25 angularly related to the fingers on the upper head 2 or, in other words, arranged in offset relationship so that the fingers do not overlie one another. The rack or frame 3 loaded with the cop-tubes C is mounted on the conveyor-chain 17 by passing the heads 19 of the studs 18 through the circular openings 14 and sliding their shanks into the slots 15. Preferably, a series of separators 21, see Fig. 2, extend between the racks 3 when they are mounted on the conveyor-chain 17 to prevent them from swaying or swinging. The separators 21 may take the form of angular brackets, as shown in Figs. 1 and 2, riveted to the lower bar of each frame 3 and projecting toward the next frame in the series. By this provision the danger of the frames swaying to cause the tubes C carried thereby to strike against each other is eliminated.

Figure 8:
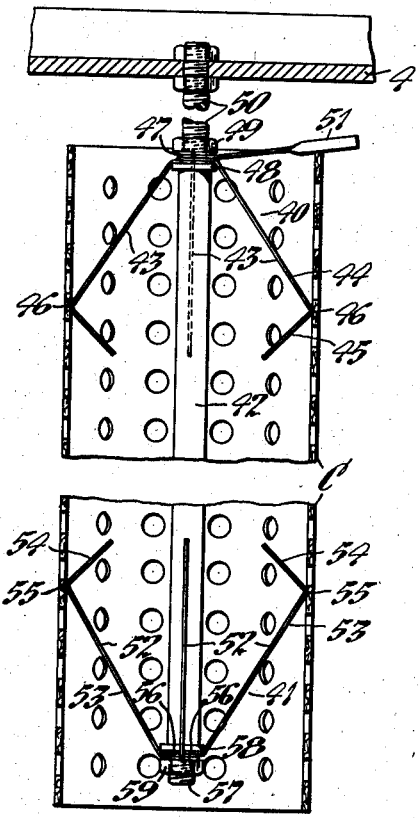
Fig. 8 is a sectional view on line 8—8 of Fig. 7 showing the spring-fingers each in contact with the interior of the tube at a single point and arranged in longitudinally-spaced series with their opposite remote ends connected to a central support and their free ends extending toward each other.
Figure 7:
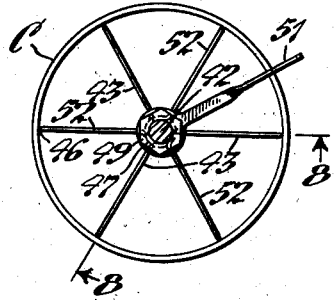
Fig. 7 is a part-sectional plan view of a one-piece or unitary holder showing a plurality of spring-fingers carried by a central support and extending radially therefrom in equiangular relationship.

A unitary holder of modified form is illustrated in Figs. 7 and 8 as having its upper and lower heads 40 and 41 carried by a single supporting rod 42 depending from the rail 4 to adapt the cop-tubes C or other hollow articles to be slid over the lower end of the holder. Each head 40 and 41 comprises a series of spring-fingers of identical construction arranged in equiangular relationship. As herein illustrated, the upper head 40 has three such fingers 43 arranged 120° apart and bent angularly intermediate their ends to provide oppositely-inclined portions 44 and 45 with an apex portion 46. The fingers 43 are provided with loops 47 at one of their ends embracing the supporting rod 42.

The loops 47 of the three spring-fingers 43 constituting the upper head 40 are clamped against a flange 48 on the rod 42 by a nut 49 screwed onto a threaded portion 50 of the rod. The fingers 43 extend radially and downwardly with respect to the supporting rod 42 in equiangular relationship therearound. A stop 51 in the form of an inclined arm is also clamped between the nut 49 and the flange 48 and extends radially of the head 40 to adapt its outer end to engage the end of the tube C.

The opposite or lower head 41 is similar in construction to the head 40 as having a series of three fingers 52, each angularly bent intermediate its ends to provide oppositely-inclined portions 53 and 54 and a contact apex 55. The fingers 52 are formed with loops 56 at one end embracing a threaded portion 57 at the lower end of the rod 42 and clamped against a flange 58 by a nut 59. The fingers 52 project radially and upwardly toward the fingers 43, see Fig. 8, being arranged in offset angular relationship with respect to the fingers 43, see Fig. 7.

With this last described form of holder a cop-tube C or other hollow article may be slid over the ends of the radially-inclined fingers 52 and 43 which yield inwardly to engage their contact apexes 55 and 46 with the interior of the tube at a series of circumferentially and longitudinally spaced points thereon. The actual contact of the spring-fingers 43 and 52 with the interior of the tube is reduced to a minimum due to the form of the contact apexes 46 and 55 and the rounded contour of the fingers. The inclined portions 53 and 45 of the lower and upper spring-fingers 52 and 43, respectively, tend to facilitate the mounting of the cop-tubes C on the holder and the engagement of the upper end of the tubes with the radially-extending arm or stop 51 prevents further movement thereof.

Figure 9:
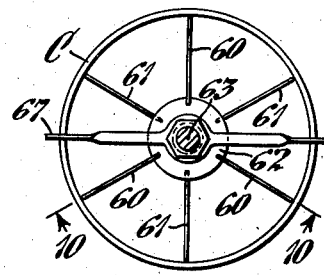
Fig. 9 is a part-sectional plan view of a unitary holder of modified form incorporating the novel features of the present invention.
Figure 10:
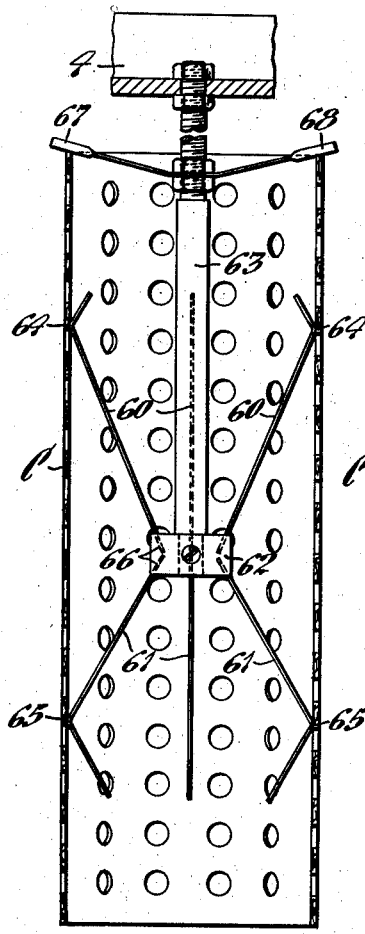
Fig. 10 is a sectional view on line 10—10 of Fig. 9 showing the opposite series of angular spring-fingers connected to a central support at adjacent ends and extending radially and longitudinally of the support in opposite directions.

The holder illustrated in Figs. 9 and 10 is similar in form to that shown in Figs. 7 and 8 as regards its unitary construction. In this type of holder, however, the longitudinally-spaced series of spring-fingers 60 and 61 project in opposite directions from a collar 62 carried at the end of a central support or rod 63. As illustrated in Fig. 10, the spring-fingers 60 and 61 are bent intermediate their ends to form contact apexes 64 and 65 and the adjacent ends of the opposite series of the spring-fingers are inserted in suitable holes 66 in the collar 62 and rigidly fastened thereto as by welding, soldering or the like. In this form of construction, as in that described above, the upper and lower fingers 60 and 61 are offset angularly with respect to each other so that no finger 60 of one series overlies a finger 61 in the other series. The stop for the end of the tube in this modification comprises oppositely-extending inclined arms 67 and 68.

The holder illustrated in Figs. 9 and 10 operates in substantially the same way as that shown in Figs. 7 and 8 in that the cop-tubes C or other hollow articles are slid over the end of the holder. During the sliding movement the fingers 61 are guided into the end of the tube by the inwardly-inclined portions at the outer end of the holder and the contact apexes 64 and 65 yieldingly engage the interior of the tube at a series of points spaced circumferentially and longitudinally thereof.

Figure 11:
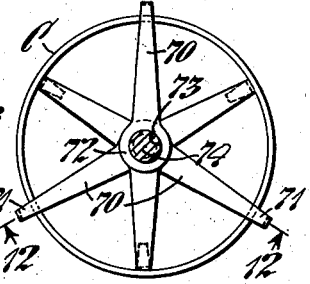
Fig. 11 is a part-sectional plan view of a further modified form of holder similar to that illustrated in Figs. 9 and 10 showing the spring-fingers as constructed of sheet-metal.
Figure 12:
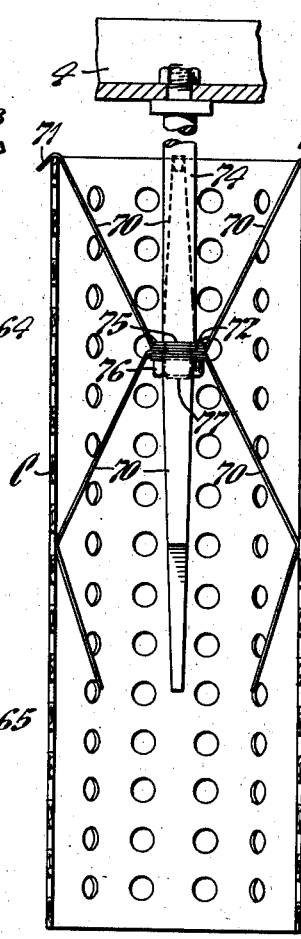
Fig. 12 is a sectional view on line 12—12 of Fig. 11 showing the ends of one of the series of fingers bent to engage the interior edge of the cop-tube at one end to partially support the tube and form a stop therefor.

The form of holder illustrated in Figs. 11 and 12 is similar to that disclosed in Figs. 9 and 10, except that the fingers are made of sheet-metal instead of round wire and the ends 71 of the upper series of fingers 70 are bent outwardly instead of inwardly to adapt them to engage the upper interior edge of the cop-tube to partially support the latter and also form stops therefor. In this modified form of construction the fingers 70 are stamped from sheet-metal and shaped to angular form, being provided at their inner ends with bosses 72 having central holes 73 to adapt them to be mounted on the reduced threaded end 77 of a central support 74. The bosses 72 are clamped in position between a shoulder 75 on the support and a nut 76 screwed onto the threaded end 77.

The cop-tubes C or other hollow articles are applied to this form of holder in the same manner as explained with respect to the two previous forms of holders.

Figure 13:
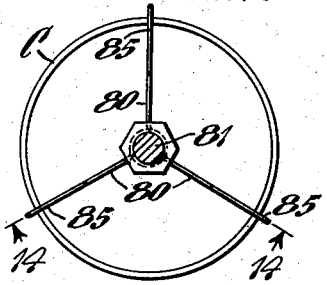
Fig. 13 is a part-sectional plan view of still another modified form of holder incorporating the novel features of the present invention.
Figure 14:
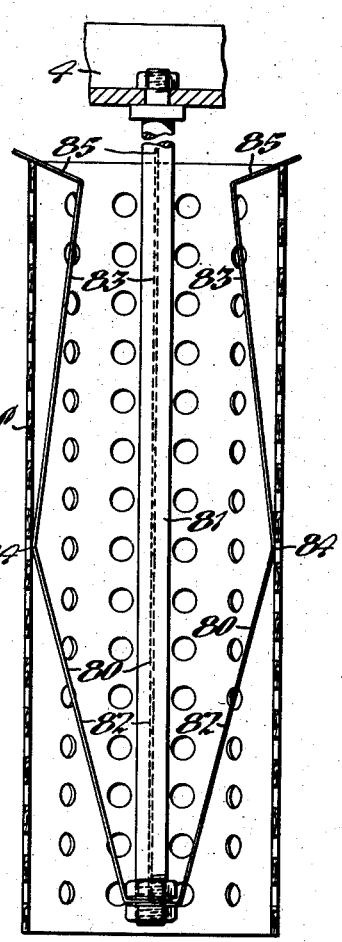
Fig. 14 is a sectional view on line 14—14 of Fig. 13 showing the holder as having a single series of spring-fingers adapted to engage the interior of the hollow article at a plurality of points spaced circumferentially and longitudinally thereof.

In the form of holder illustrated in Figs. 13 and 14 a single series of spring-fingers 80 are attached at their lower ends to the end of a central support or rod 81 and extend radially and upwardly through substantially the whole length of a cop-tube C. Each of the fingers 80 has an outwardly-inclined portion 82, an inwardly-inclined portion 83 forming a contact apex 84 therebetween, and an outwardly-inclined portion 85 adapted to engage the interior edge of the upper end of the cop-tube C to form a stop for limiting the movement of the cop-tube on the holder. In this form of construction only one set of spring-fingers is provided with the outwardly-inclined portions 85 serving to centralize the cop-tube C on the holder and partially support it while the contact apexes 84 function as its main support.

It will be understood that with this last-described form of construction the cop-tube C is slid over the end of the holder and the fingers 80 are guided into the interior of the tube by the outwardly-inclined portions 82, the fingers yieldingly engaging the interior of the cop-tube at points 84 intermediate its ends and also at its upper end.

While several forms of holders are herein shown and described, it is to be understood that further modifications may be made in the construction and arrangement of the parts of the device without departing from the spirit or scope of the invention. Therefore, without limiting ourselves in this respect, we claim:

1. A holder for hollow articles having longitudinally-spaced heads for clamping the hollow articles therebetween, each of said heads comprising a plurality of radially- and longitudinally-extending fingers arranged in spaced relation to each other with their adjacent ends connected together to provide a skeleton structure of generally conical form with the fingers of the opposite heads adapted to enter the opposite ends of the hollow articles and engage the latter at points spaced circumferentially of the inner edges thereof.

2. A holder for hollow articles having longitudinally-spaced heads for clamping the articles therebetween, each of said heads comprising a plurality of radially-extending angularly-shaped resilient fingers arranged in spaced relation to each other with the adjacent ends of the fingers connected together to provide a skeleton structure of generally conical form, said heads being adapted to enter the ends of a hollow article to yieldingly engage the fingers with the interior edges thereof at circumferentially-spaced points thereon.

3. A holder for hollow articles having longitudinally-spaced heads, each head comprising a plurality of angularly-shaped, radially-extending fingers arranged in spaced relation to each other with their adjacent ends connected together to provide a skeleton structure of generally conical form, and supporting members for carrying the opposite heads, said supporting members being relatively movable to clamp the heads against the opposite ends of the hollow articles to engage the fingers with the interior edges thereof at circumferentially-spaced points thereon.

4. Means for supporting a plurality of hollow articles comprising a frame having opposite parallel rails, individual holders projecting from each rail to adapt them to enter the ends of the hollow articles, and means for adjusting the rails toward each other to clamp the hollow articles therebetween.

5. Means for supporting a plurality of hollow articles comprising a frame having opposite parallel rails, holders comprising circumferentially-spaced resilient elements projecting from the rails to adapt them to enter the ends of the hollow articles to engage the interior thereof, and means for adjusting the rails toward each other to clamp the articles in spaced relationship between the rails.

6. A frame for supporting a plurality of hollow articles in parallel spaced relation thereon, said frame comprising opposite parallel rails, holders comprising a plurality of angularly-spaced resilient members forming substantially conical heads projecting from the rails to adapt them to enter the ends of the articles to engage the interior thereof, and means for adjusting the rails toward each other to clamp the articles in position on the frame.

7. A frame for supporting a plurality of hollow articles comprising opposite parallel rails, holders projecting from the rails and adapted to enter the interior of the articles to support them at their opposite ends, tie-rods connecting the rails, means on said tie-rods for spacing the rails a predetermined distance apart, and means cooperating with the tie-rods for drawing the rails together to clamp the articles in position on the holders.

8. A frame for supporting a plurality of hollow articles comprising upper and lower parallel rails, holders projecting from the rails to adapt them to engage the interior of the articles at their opposite ends, tie-rods fixedly connected to the lower rail and having their opposite ends threaded, bushings screwed onto the threaded ends of said tie-rods to adapt them to abut the side of the upper rail to locate it in predetermined spaced relationship with respect to the lower rail, and screws extending through the upper rail and screwed into bushings to draw the rails toward each other to clamp the articles in position on the holders.

EVERETT C. ATWELL.
GEORGE W. TEW.
HERBERT AUSTIN.